UNITED STATES PATENT OFFICE.

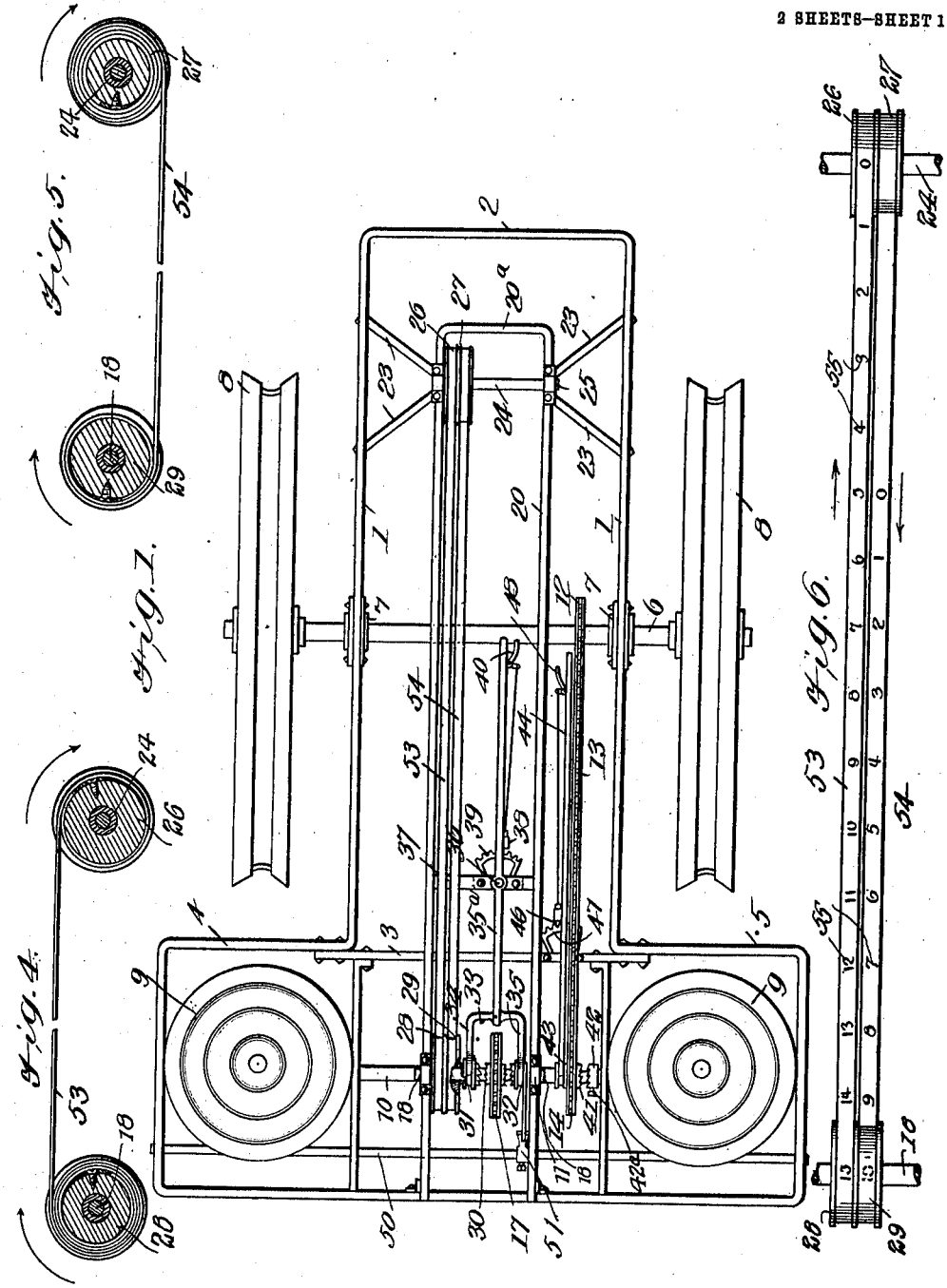

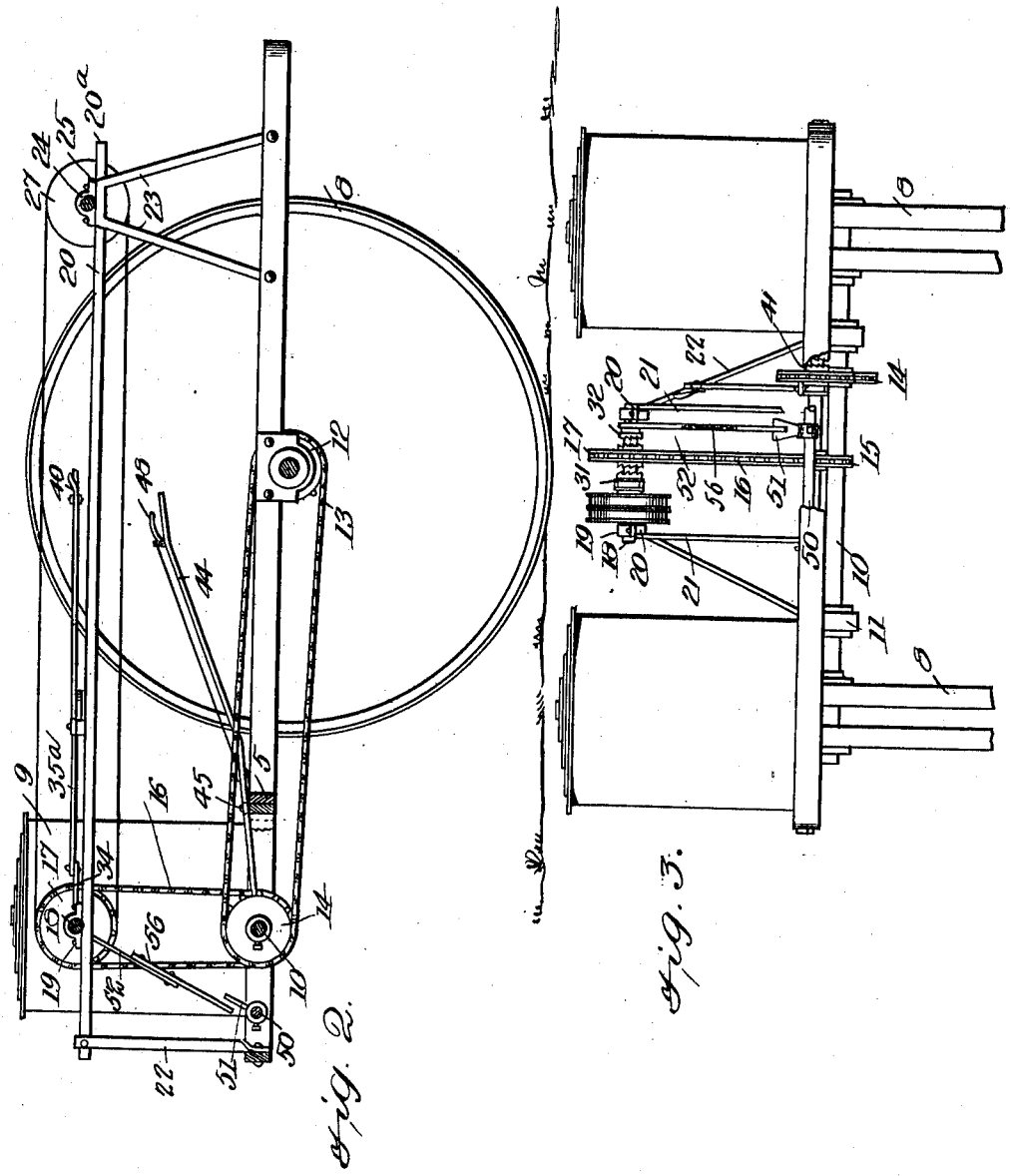

JOSEPH VINTON, OF SPOKANE, WASHINGTON, ASSIGNOR OF ONE-HALF TO OMAR GAMBLE, OF SPOKANE, WASHINGTON.

CORN-PLANTER.

982,649.  Specification of Letters Patent.  Patented Jan. 24, 1911.

Application filed June 25, 1910. Serial No. 568,814.

*To all whom it may concern:*

Be it known that I, JOSEPH VINTON, a citizen of the United States, and a resident of Spokane, in the county of Spokane and State of Washington, have invented certain new and useful Improvements in Corn-Planters, of which the following is a specification.

My invention is an improvement in corn planters, and consists in certain novel constructions and combinations of parts hereinafter described and claimed.

The object of the invention is to provide an attachment for corn planters, which will enable the operator without any mathematical procedure, and at a glance to determine the exact point at which to commence the new row, in order that the hills may be in a straight line both longitudinally and transversely of the field.

Referring to the drawings forming a part hereof:—Figure 1 is a plan view of a planter provided with the improvement, Fig. 2 is a longitudinal vertical section of the improvement in place on a planter, Fig. 3 is an end view, Fig. 4 is a diagrammatic sectional view of the tape 53, Fig. 5 is a similar view of the tape 54, and Fig. 6 is a plan view of the tapes.

In the embodiment of the invention shown in the drawings, the frame of the planter comprises a substantially rectangular portion, composed of side bars 1, connected at each end by cross bars 2 and 3 respectively and at the front end of the said portion the frame is provided with lateral extensions 4 and 5. An axle 6 is journaled transversely of the frame at approximately the longitudinal center thereof and a wheel 8 is secured to each end of the axle. A seed box 9 is supported on each of the lateral extensions 4 and 5 and below the said boxes a counter shaft 10 is journaled transversely of the frame in bearings 11 on the said frame.
A sprocket wheel 12 is secured to the axle 6 and the sprocket chain 13 connects the said wheel 12 with the sprocket wheel 14 journaled loosely on the counter shaft 10. The hub of the sprocket wheel 14 is provided at one end with ratchet teeth 41 and at the opposite end with an annular groove 43. The ratchet teeth 41 are adapted to engage with ratchet teeth on the sleeve 42, secured to the said shaft by a set screw 42ª, the said sleeve being arranged adjacent to the hub of the wheel 14. The wheel 14 is moved on the shaft by means of a lever 44, pivoted to the frame at 45 and having a forked end engaging in the groove 43. A toothed segment 47 is secured to the frame and the lever is provided with a tooth 46, slidable thereon for engaging the segment, the said tooth being operated by a grip 48, in the usual manner. It will be evident that when the tooth is released from the segment and the lever is swung in the proper direction, the sprocket wheel 14 will be moved laterally to bring the teeth 41 thereof into engagement with the teeth of the sleeve 42, whereby to connect the shaft 10 with the axle 6. Near its center, the shaft 10 is provided with another sprocket wheel 15, which is connected by a chain 16, with a sprocket wheel 17, secured to a shaft 18. The shaft 18 is journaled in bearings 19 on bars 20, arranged longitudinally of the frame and above the same, and connected at their rear ends at 20ª. The bars 20 are supported at their front ends by standards 21, arising from the frame and braced laterally by braces 22 and at their rear ends by standards 23 secured to the side bars 1. The bars 20 are arranged near the longitudinal center of the frame, one on each side of the said center and the standards 23 are inclined inwardly toward their upper ends. A shaft 24 is journaled transversely of the bars at their rear ends in bearings 25 and a pair of grooved rollers or wheels 26 and 27 are secured to the said shaft. A second pair of grooved rollers or wheels 28 and 29 are secured to a sleeve 31, journaled on the shaft 18, and the said rollers are in alinement with the rollers 26 and 27.

The sprocket wheel 17 is secured to the shaft 18 and rotates therewith, and the hub 30 of the said wheel is provided at each end with clutch teeth. The said teeth are adapted to mesh with similar teeth on the sleeves 31 and 32 before mentioned. A lever 35ª is pivoted at 36 on a curved bar 37 connecting the bars 20 and is provided at one end with a pair of substantially parallel arms 34 and 35, each of which is forked as at 33, at its free end. The fork of the arm 34 engages an annular groove in the sleeve 31 and the fork of the arm 35 engages a similar groove in the sleeve 32. A tooth 38 is slidable on the lever 35ª and coöperates with the teeth of a segment 39 secured to the cross bar 37 and the tooth is operated by a grip 40, on the lever. It will be evident that when the lever is moved in one direction, the sleeve 32 will be clutched to the sprocket wheel 17 and the sleeve 31 will be disconnected therefrom. A movement of the lever in the opposite direction will clutch the sleeve 31 to the sprocket wheel and disconnect the sleeve 32.

As before stated, the arm 35 is secured to the sleeve 32 while the rollers 28 and 29 are secured to the sleeve 31. Thus when the arm 52 is connected with the sprocket wheel and in operation, the rollers are disconnected from the said wheel and are idle. The arrangement is such that when the arm is connected or disconnected with its operating means, the rollers are moved in the opposite direction. By moving the lever 35$^a$ into the position shown in Fig. 1, both sleeves are disconnected from the said wheel.

In front and below the seed boxes a trip shaft 50 is journaled transversely of the frame, the said shaft operating the dropping mechanism of the seed boxes in the usual manner. The said shaft is provided with a trip arm 51 which is engaged by the arm 52 on the sleeve 32 journaled on the shaft 18 once during each rotation of the said sleeve to operate the dropping mechanism.

It will be evident that the seed boxes are provided with the usual seed plates, not shown, having cells for receiving the grain and that the said plates drop the seed from the cells on to the usual dropping valves not shown. When a specified number of cells have delivered their contents of seed, the valves are operated to drop the seed into the usual furrow openers, not shown. The shaft 10 operates the seed plates and since the above described mechanism is old and well known and forms no part of the present invention, it is not deemed necessary to show or describe the same more fully. The shaft 10 when the machine is in operation is rotated continuously and the shaft 50 is oscillated intermittently.

It will be noticed that the bars 20 constitute an upper or auxiliary frame, and each of the grooved wheels 26, 27, 28 and 29 is a reel upon each pair of which winds a tape 53 or 54 as the case may be, the tape 53 winding on the reels 26 and 28, and the tape 54 on the reels 27 and 29, and the tapes are oppositely arranged so that when one tape is winding up on one reel the other tape is unwinding from the reel on the same shaft. Each of the tapes in the present instance, is 25 feet in length, and the shaft 18 is 44 inches from the shaft 24, that is the distance between two hills of corn. The tape reels 28 and 29 are secured to the sleeve 31, and the tripping arm 52 is secured to the sleeve 32, so that when the trip arm is thrown out of gear the continuation of the same movement throws the tape reels into gear.

The operation of the device is as follows. When the machine has dropped the first row, just before the end of the row is reached and immediately after the last hill has been dropped, the trip arm sleeve 32 is disconnected from the shaft 18, and the tape reels are connected therewith. The tapes are provided with a scale 55 and the connection between the axle and the reels is such that the tapes measure the exact distance traveled by the machine. It will be observed that the tape 53 winds upon the rollers on the upper side thereof while the tape 54 winds upon the rollers on the lower side thereof, so that when the tape 53 moves in one direction, the tape 54 will move in the opposite direction. The numerals constituting the scales on the tape are arranged in the same manner however running consecutively in the same direction. Each tape is 25 feet in length, and the scale is preferably sub-divisions of a foot. The divisions representing the feet only are numbered, and the said numbers run consecutively in the same direction on both tapes. The tapes are so arranged on the rollers, that each number on the tape 54 registers with its complementary number on the tape 53, each two registering numbers on the tape at the roller footing up 25. In whatever direction the tapes are moved this relation holds good. The operating means for the tapes is so geared to the machine, that the actual distance traveled by the machine appears on the tape. So for instance, the machine moves 15 feet with the rollers in gear, each tape will wind off or on as the case may be, a corresponding distance. After the last hill is dropped the operator swings the lever 35$^a$, thus throwing the dropping mechanism out of gear and by the same movement throwing the tape operating mechanism into gear. The machine is now driven to the end of the field and turned. The operator now notices the unit of the scale which registers with, for instance, the shaft 18. If for instance, this numeral is 15, a glance at the companion tape shows that he must drive 10 feet to again bring the machine into register with the last hill dropped for the starting of the new row. The dropping mechanism is then coupled, the same movement uncoupling the tape operating mechanism and the machine is started. With his foot, the operator rotates the rollers on the shaft 24 to return the tapes to their original position and the procedure is repeated at the opposite end of the field.

It will be noticed from an inspection of Fig. 2, that the arm 52 consists of two sections, the said sections being connected by bolts 56. The bolts pass through longitudinal slots in the sections so that the length of the arm may be varied.

It will be evident that by moving the lever 35ª in one direction the rollers 28 and 29 will be coupled to the sleeve 31, and the sleeve 32 will be disconnected therefrom. In other words whenever the rollers are coupled to the sprocket wheel the dropping mechanism is disconnected therefrom. By stopping the lever in the halfway position, the rollers and the dropping arm are both disconnected from the sprocket wheel. The cycle of the operation is as follows:—Immediately after the dropping of the last hill in the row, the lever 35ª is swung to couple the rollers 28 and 29 with the sprocket wheel, and uncouple the sleeve 32. The machine is moving during this operation and continues moving to the end of the field where it is turned. The driver now glances at the tapes. If as shown in Fig. 6, the tape 53 registers 15, that is the numeral 15 is directly above the shaft 18, he knows that the machine has traveled 15 feet. A glance at the other tape shows the number 10 in register with the shaft, and this indicates to the driver that he has 10 feet to travel to come into a line with the hill last planted. As soon as this distance is traveled, the dropping mechanism is coupled to the shaft 18 and the rollers are disconnected therefrom.

I claim:—

1. The combination in a check rower, of an auxiliary frame supported above the check rower, a shaft journaled transversely of the frame at each end thereof, a driving connection between the operating mechanism of the planter and one of the shafts for driving the said shaft, means for simultaneously disconnecting the dropping mechanism from the operating means, and connecting the said shaft with the operating means, a pair of grooved wheels on each shaft, the wheels of one shaft registering with the wheels of the other shaft, tapes winding upon the corresponding wheels of the shafts, each of said tapes being provided with a scale and winding on the wheels in opposite directions, said scales being of equal and definite length, and the tapes being so arranged that each numeral of one tape will register with that numeral of the other tape, which added to the first-named numeral will equal the length of the scale.

2. The combination in a check rower, of an auxiliary frame supported above the check rower, a shaft journaled transversely of the frame at each end thereof, a pair of grooved wheels on each shaft, the wheels of one shaft registering with the wheels of the other shaft, tapes winding upon the corresponding wheels of the shafts, each of said tapes being provided with a scale and winding on the wheels in opposite directions, said scales being of equal and definite length and the tapes being so arranged that each numeral of one tape will register with that numeral of the other tape which added to the first-named numeral will equal the length of the scale, a driving connection between the operating mechanism of the planter and one of the shafts for driving the said shaft, and means for connecting and disconnecting the shaft with the said operating mechanism.

3. The combination in a check rower, of a pair of shafts journaled transversely thereof and in spaced relation, a pair of grooved wheels on each shaft, the wheels of one shaft registering with the wheels of the other shaft, tapes winding upon the corresponding wheels of the shafts, each of said tapes being provided with a scale and winding on the wheels in opposite directions, said scales being of equal and definite length and the tapes being so arranged that each numeral of one tape will register with that numeral of the other tape which added to the first-named numeral will equal the length of the scale, a driving connection between the operating mechanism of the planter and one of the shafts for driving the said shafts, and means for simultaneously disconnecting the dropping mechanism from the operating means and for connecting the shaft with the said operating means.

4. The combination in a check rower, of a plurality of pairs of grooved wheels, the pairs being arranged in spaced relation, and with the corresponding wheels of each pair in register, tapes winding upon the corresponding wheels on each pair, each of said tapes being provided with a scale and winding on the wheels in opposite directions, said scales being of equal and definite length and the tapes being so arranged that each numeral of one tape will register with that numeral of the other tape which added to the first-named numeral will equal the length of the scale, a driving connection between the operating mechanism of the planter and one of the shafts for driving the said shaft, and means for connecting and disconnecting the shaft with the said operating mechanism.

5. In a check rower, a pair of tapes, each of the said tapes being provided with a scale, the scales being of equal and definite length, means for supporting said tapes for simultaneous movement in opposite directions, the said tapes being so arranged that each numeral of one tape will register with that numeral of the other tape which added to the first-named numeral will equal the length of the scale, and means for connecting and disconnecting the moving means of the tapes with the operating mechanism of the check rower.

6. In a check rower, a pair of tapes, each of said tapes being provided with a scale consisting of graduations dividing the said tapes into a plurality of units, the scales being of equal length, means for supporting the said tapes for simultaneous movement in opposite directions, a common indicator for coöperating with both tapes, the said tapes being so arranged that the sum of the units at the indicator is at all times equal to the length of the scale, and means for connecting and disconnecting the moving means of the tapes with the operating mechanism of the check rower.

JOSEPH VINTON.

Witnesses:
   C. E. TRAINOR,
   SOLON C. KEMON.